United States Patent Office 3,310,859
Patented Mar. 28, 1967

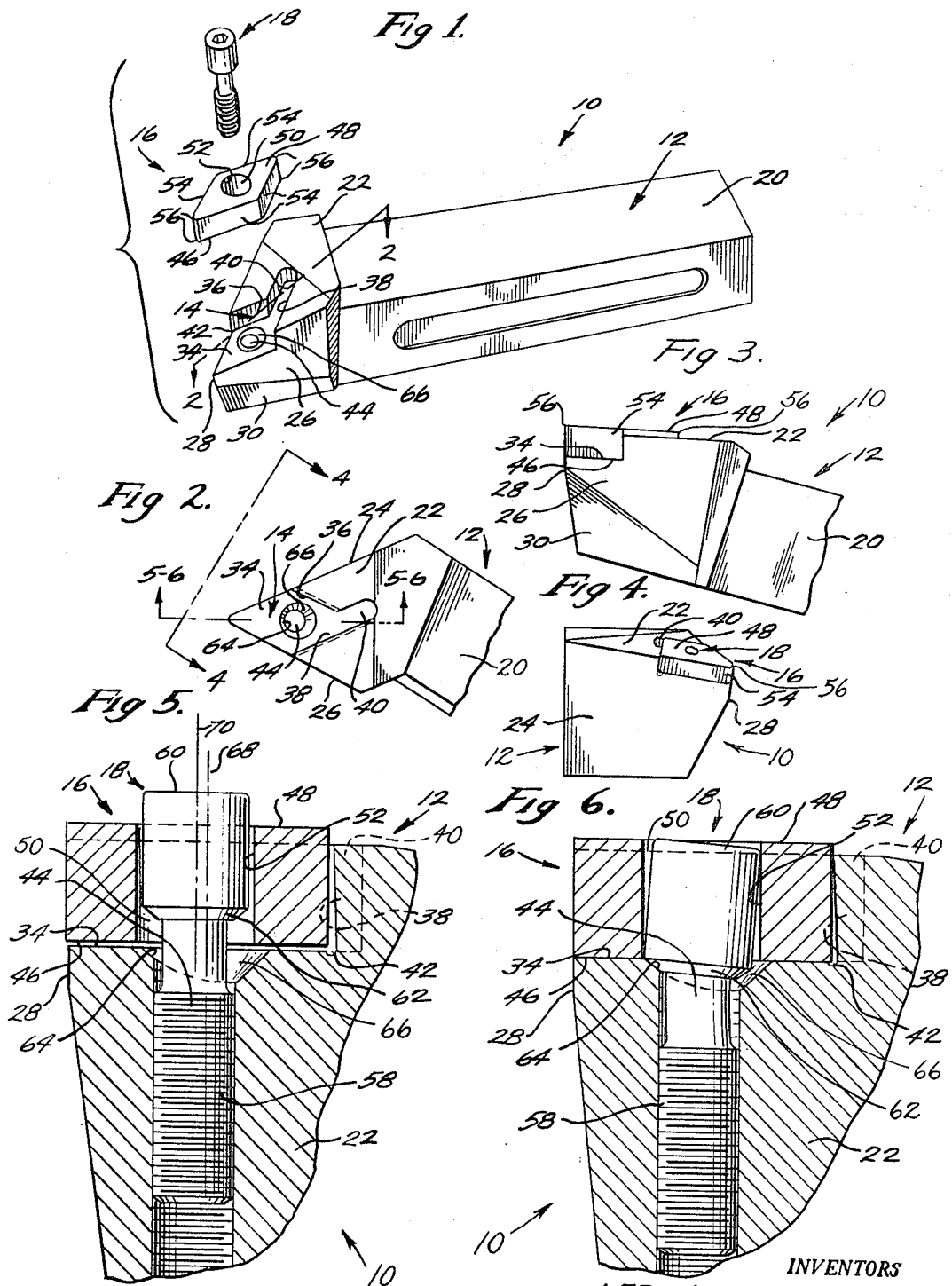
March 28, 1967  LE ROY H. DIEMOND ETAL  3,310,859
CUTTING TOOL
Filed May 3, 1966
INVENTORS
LEROY H. DIEMOND
FRANK T. OBROCHTA
ATTORNEYS

3,310,859
CUTTING TOOL
Le Roy H. Diemond, 82 Arnold Drive 06108, and Frank T. Obrochta, 44 Claire Road 06118, both of East Hartford, Conn.
Filed May 3, 1966, Ser. No. 547,241
8 Claims. (Cl. 29—96)

This invention relates in general to improvements in cutting tools and deals more particularly with improvements in cutting tool assemblies of the disposable cutter insert type.

The general object of the invention is to provide a cutting tool assembly of the aforedescribed character wherein a disposable cutter insert is releasably secured and retained in a holder in a most facile and efficient manner by a simple screw attachment means.

Another object of the invention is to provide a cutting tool assembly wherein a releasably attached cutter insert may be rapidly and accurately repositioned in an associated holder in any one of a plurality of selected positions, each of the positions causing a different one of a plurality of like cutting edges to be brought into a working position.

A further object of the invention is to provide a tool holder assembly of the aforedescribed character which in comparison to the present tool assemblies of the same general type omits parts and is of substantially lower manufacturing cost, while nevertheless exhibiting other qualities the same or better than present structures.

Other objects and advantages of the invention will be apparent from the following description and from the drawing forming a part thereof.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 is an exploded perspective view of a cutting tool assembly embodying the present invention.

FIG. 2 is a fragmentary plan view of the tool holder of FIG. 1 taken along the line 2—2 of FIG. 1.

FIG. 3 is a fragmentary elevational view of the cutting tool assembly of FIG. 1.

FIG. 4 is an end view of the cutting tool assembly of FIG. 1 taken generally along the line 4—4 of FIG. 2.

FIG. 5 is a fragmentary longitudinal sectional view of the cutting tool assembly of FIG. 1 taken along the line 5—5 of FIG. 2 showing the clamp screw in its normal or unclamped position in the tool holder and showing the cutter insert in partial assembly therewith.

FIG. 6 is generally similar to FIG. 5, being taken along the line 6—6 of FIG. 2, but shows the insert in the fully assembled position with the clamp screw in a cammed position.

A tool assembly embodying the present invention and indicated generally by the reference numeral 10 is shown to comprise a support member or tool holder 12 having a cutter insert receiving notch 14 defined therein. A cutter insert indicated generally at 16 is received in the notch and is held in assembly therein by a clamp screw indicated generally at 18. The clamp screw normally remains in threaded assembly with the tool holder 12 and is threadably movable relative thereto between a normal or unclamped position and a cammed or clamped position. When the clamp screw 18 is in its normal position the insert 16 may be moved readily into assembled relationship with the tool holder or separated therefrom. The clamp screw is moved to the cammed position to securely hold the insert in assembled relationship with the tool holder. For the purpose of clarity, the clamp screw 18 is shown removed from the tool holder 12 in the exploded view of FIG. 1, however, it should be understood that it is not normally necessary to remove the screw from the holder at any time.

In the description and claims that follow, relative terms such as, horizontal, vertical, forward, rear, upper and lower have been employed merely for convenience of description and refer to the tool assembly oriented as shown in FIG. 3. Such terms are not to be regarded as limiting the invention in any manner.

Considering now the tool holder in detail and referring particularly to FIGS. 1 and 2, the holder 12 of the presently preferred embodiment is shown to comprise an elongated body or shank portion 20 of conventional type adapted to be mounted in a tool post (not shown) on a machine tool. At the forward end of the shank portion 20 there is a generally V-shaped head portion 22 which includes generally vertically disposed side surfaces 24 and 26. The side surfaces 24 and 26 converge forwardly to an apex or nose 28 and form an included angle of approximately 50° therebetween. Also included on the head 22 is a lower side surface 30 which is inclined downwardly and rearwardly from the respectively associated surface 26 to provide clearance between the cutting tool holder 12 and a workpiece (not shown) to be cut when the tool assembly is in the working position. It will also be noted that the head portion 22 is offset at a compound angle relative to the shank portion 20 to minimize shank interference when the cutter is in the working position.

The head portion 22 which provides support for the cutter insert 16 includes the insert-receiving notch 14 which is defined by a generally horizontal seating surface 34 and at least one generally forwardly facing clamp surface which extends generally vertically upwardly with respect to the seating surface.

As will be apparent, the seating surface 34 may be formed on the holder per se or on a suitable shim member supported on the holder. Similarly, the shape of the cutter insert used in practicing the invention may vary and the shape of the notch 14 will of course be determined generally by the configuration of the insert which it is to receive. In the presently preferred embodiment of the invention, a prismatic cutter insert is employed which will be hereinafter further described. Consequently, the aforesaid clamp surface comprises two forwardly facing upwardly extending clamp walls 36 and 38. The walls 36 and 38 converge rearwardly at an included angle of approximately 50°. For a purpose that will be hereinafter further apparent, the walls 36 and 38 are inclined slightly forwardly at an angle of inclination of approximately 2° from the vertical plane as best shown with reference to the wall 38, FIGS. 5 and 6. The walls 36 and 38 meet in a clearance opening 40 at the rear of the notch 14, best shown in FIGS. 1 and 2. This clearance opening is provided to permit intimate contact between the walls 36 and 38 and associated surfaces on the cutter insert as described below. It will also be noted that the intersections between the walls 36 and 38 and the seating surface 34 are undercut or provided with channels as indicated at 42 in FIGS. 5 and 6 to prevent interference with the associated corners of the cutter insert.

At this point it should be noted that the head portion 22 is also provided with a threaded opening 44 in the seating surface 34 which is preferably normal thereto for receiving the clamp screw 18. The said opening may be provided with a bushing, with a cam surface therewithin or, as shown, a cam surface may be provided in the opening per se for moving the clamp screw to a cammed position and such surface will be hereinafter described in conjunction with the clamp screw.

In accordance with the present invention, the cutter insert includes a seating face for engaging the seating surface on the tool holder and at least one clamp face which is adapted to engage the clamp surface on the holder. Preferably and as shown, the cutter insert 16 has a first seating face 46 and a second seating face 48 which is spaced vertically from the first face and which is generally parallel and opposite thereto. In FIG. 6 the insert 16 is shown assembled with the tool holder 12 with the first seating face 46 engaging the seating surface 34, however, it should be understood that the insert may be positioned in the holder with either seating face 46, 48 engaging the seating surface 34. Thus, the insert 16 is invertible with respect to the holder 12.

The insert also includes an opening which is at least partially defined by a forwardly facing generally upwardly extending wall. This wall cooperates with the clamp screw to urge the insert clamp face into engagement with the tool holder clamp surface in a manner to be hereinafter further discussed.

The prismatic cutter insert of the illustrated embodiment includes such an opening in the form of a generally cylindrical bore 50 which extends centrally therethrough generally normal to the seating faces 46 and 48. The bore has a wall 52 and is generally vertically aligned with the holder opening 44.

The insert is generally symmetrical relative to the axis of the bore 50 and includes a first pair of vertically disposed rearwardly convergent clamp faces 54, 54 and a second pair of clamp faces 54, 54 which are substantially identical to the first pair, but which converge forwardly. The cutter insert 16 may be received within the notch 14 with either pair of clamp faces 54, 54 engaging the associated walls 36 and 38. Thus, it should be apparent that the cutter insert 16 is reversible in a horizontal plane as well as invertible with respect to the tool holder 12.

The cutter insert used in practicing the invention preferably has a plurality of cutting edges. Thus, the insert of the illustrated embodiment has four cutting edges 56, 56 formed at opposite corners of the insert by the intersection of each pair of clamp faces 54, 54 and the associated seating faces 46 and 48 as best shown in FIG. 1. When the insert is assembled within the tool holder, the uppermost forward corner or cutting edge of the insert is in the working or cutting position, as best shown in FIG. 3. By inverting and/or reversing the insert relative to the holder it is possible to bring any one of the three remaining cutting edges into the working position. As previously noted, the shape of the insert used in practicing the invention may vary; therefore, it should now be evident that other cutter forms which may also provide a plurality of cutting edges may be employed in practicing the invention.

Referring now to FIG. 4, it will be noted that the clamp screw 18 includes a shank portion 58 which is threadably received in the holder opening 44 and a head 60 which is received in the insert bore 50. The shape of the head may vary, however, it is normally axially aligned with the shank portion 58 and with the threaded opening 44. Preferably, the head 60 is generally cylindrical having a diameter substantially larger than the diameter of the shank portion 58. The diameter of the insert bore 50 is, in turn, slightly larger than the diameter of the head. Thus, when the clamp screw 18 is in the normal position as it appears in FIG. 5 the insert 16 may be moved readily into and out of assembled relationship therewith. This arrangement permits the insert to be removed for replacement or repositioning relative to the holder without removal of the clamp screw from the holder.

A cam means for moving the clamp screw to the cammed position is provided by a generally conical surface on the screw which cooperates with a cam surface on the tool holder. As best shown in FIGS. 5 and 6, the clamp screw 18 includes a generally conical surface 62 between the head 60 and the shank portion 58 which converges toward the shank portion. The tool holder 12 in turn includes a cam surface 64 adjacent at least the forward side of the opening 44 and generally opposite the walls 36 and 38. Preferably, the cam surface 64 is provided by an upwardly flared generally conical recess 66 which surrounds the opening 44. It will be noted that the cam surface 64 is inclined generally upwardly and forwardly with respect to the opening 44. The conical portion 62 is adapted to engage the cam surface 64 to displace the head 60 rearwardly or generally toward the bore wall 52 as the clamp screw is threaded into the tool holder.

To provide clearance for rearward displacement of the head 60 relative to the tool holder the axis of the recess 66 is offset generally rearwardly from the axis of the holder opening 44 as best shown in FIG. 5 where the axes are respectively indicated at 68 and 70. The recess axis 68 may be slightly inclined relative to the opening axis 70, however, for convenience and economy of manufacture the conical recess 66 is also preferably axially normal to the seating surface 34.

To permit displacement of the head 60 a loose fit may, for example, be provided between the shank portion 58 and the shank receiving opening 44 so that the entire screw may be axially displaced or inclined generally rearwardly relative to the latter opening. But preferably the shank portion is restrained against axial displacement in the opening, the screw being sufficiently resilient to permit the head to be bent rearwardly relative to the shank when the screw is moved to the cammed position.

In the cammed position of FIG. 6 the head 60 engages the forwardly facing portion of the bore wall 52 to urge the insert rearwardly and to urge the clamp faces 54, 54 into engagement with the associated walls 36 and 38 thereby holding the insert securely in assembly with the holder. The slight forward inclination of the said walls insures intimate contact between at least portions of the aforementioned engaging faces and walls.

The action of the cutting tool assembly in engagement with a workpiece produces a reactive force which tends to urge the cutter insert generally downwardly and rearwardly relative to the tool holder. Thus, the cutting action produces no appreciable stress in the clamp screw.

The invention claimed is:

1. A cutting tool assembly comprising a tool holder having a cutter insert receiving notch defined by a generally horizontal seating surface and at least one generally forwardly facing clamp surface extending generally vertically upward with respect to said seating surface, said holder having a threaded screw receiving opening in said seating surface and including a cam surface adjacent at least the forward side of said opening and generally opposite said clamp surface, said cam surface being inclined generally upwardly and forwardly with respect to said opening, a cutter insert received in said notch and having a first seating face engaging said seating surface and including an opening at leat partially defined by a forwardly facing generally upwardly extending wall, said insert including at least one clamp face adapted to engage said clamp surface, and a resilient clamp screw having a shank portion threadably received within said holder opening and including a head received within said insert opening and normally axially aligned with said shank portion and with said holder opening, said screw including a generally conical portion between said head and said shank portion converging toward said shank portion and adapted to engage said cam surface to displace said head rearwardly and generally toward said wall as said screw is threaded into said opening, said head in the rearwardly displaced position engaging said wall of said insert opening and urging said clamp face rearwardly into engagement with said clamp surface whereby said insert is securely held in assembly with said holder.

2. A cutting tool assembly as set forth in claim 1 wherein said head is bent relative to said shank portion in being rearwardly displaced.

3. A cutting tool assembly as set forth in claim 1 wherein said head is generally cylindrical having a diameter substantially larger than the diameter of said shank, wherein said forwardly facing insert wall comprises a rear portion of a generally cylindrical insert bore having a diameter slightly larger than the diameter of said head, and wherein said insert is movable into assembled relationship with said holder and separable therefrom when said screw is in said normal position.

4. A cutting tool assembly as set forth in claim 1 wherein said clamp surface is normal to said seating surface and wherein said insert generally complements associated portions of said notch and is generally symmetrical relative to the axis of said bore.

5. A cutting tool assembly as set forth in claim 4 wherein said insert includes a second seating face parallel to and generally opposite said first seating face and vertically spaced therefrom and wherein said insert is adapted to be received in said notch with either of said seating faces engaging said seating surface.

6. A cutting tool assembly as set forth in claim 1 wherein said cam surface comprises an upwardly flared generally conical recess surrounding said holder opening and wherein the axis of said recess is offset generally rearwardly relative to the axis of said holder opening.

7. A cutting tool assembly as set forth in claim 6 wherein both said conical recess and said holder opening are axially normal to said seating surface.

8. A cutting tool assembly as set forth in claim 1 wherein said clamp surface comprises two rearwardly convergent upwardly extending slightly forwardly inclined clamp walls.

References Cited by the Examiner

UNITED STATES PATENTS

| | | | |
|---|---|---|---|
| 3,137,059 | 6/1964 | Hertel | 29—96 |
| 3,226,797 | 1/1966 | Hertel | 29—96 |
| 3,238,600 | 3/1966 | Milewski | 29—96 |

WILLIAM W. DYER, Jr., *Primary Examiner.*

HARRISON L. HINSON, *Examiner.*